Patented Nov. 25, 1941

2,264,191

UNITED STATES PATENT OFFICE 2,264,191

STABILIZED DISPERSIONS OF CHLOROPRENE POLYMERS AND PROCESS OF PRODUCING SAME

Howard W. Starkweather, New Castle County, Del., and Frank N. Wilder, Woodstown, N. J., assignors to E. I. du Pont de Nemours & Company, Wilmington, Del., a corporation of Delaware No Drawing. Application June 29, 1938, Serial No. 216,586

24 Claims. (Cl. 260—32)

This invention relates to the preparation of stable aqueous dispersions of rubber-like polymers of chloro-2-butadiene-1,3 (hereinafter for convenience called chloroprene). More particularly, it relates to the use of such dispersions in the arts.

It has been disclosed in a copending application of Collins, Serial No. 204,305, filed April 26, 1938, that chloroprene may be polymerized in aqueous emulsion in the presence of sulfur to give synthetic latices from which rubber-like articles of greatly improved strength may be prepared. In certain cases, however, the utilization of these latices is interfered with by a tendency for the polymer to separate from the latex during storage, mechanical agitation, or addition of compounding ingredients and by the instability of the compounded latex.

It is an object of the present invention to polymerize chloroprene while the chloroprene is dispersed in an aqueous medium in the presence of sulfur and under conditions which impart to the resulting dispersion of polymer an improved stability. Another object is to produce aqueous dispersions of polymerized chloroprene containing sulfur which have an improved stability. A still further object is to prepare latices of this type which, when compounded, have improved stability. More general objects are to provide an improved method for polymerizing chloroprene while dispersed in an aqueous medium in the presence of sulfur and to produce dispersions of chloroprene by this method which have improved properties. Other objects will appear hereinafter.

Although alcohols and ketones in large amounts are generally effective in causing the coagulation of aqueous dispersions, it has now been found that the above objects may nevertheless be accomplished when chloroprene is polymerized while dispersed in an aqueous medium in the presence of sulfur by having present also small proportions of water soluble alcohols and ketones. A preferred embodiment of the invention involves the use of water soluble abietates or hydroabietates or of water soluble salts of sulfuric acid esters of alcohols of the aliphatic series containing from 8 to 16 carbon atoms as emulsifying agents.

The varied embodiments of this invention are illustrated in the following examples. It should be understood, however, that these examples are intended to be illustrative only, and are not intended to limit the scope of the invention. The term "parts" whenever hereinafter used signifies "parts by weight."

*Example I*

One hundred parts of chloroprene substantially free from acetaldehyde, monovinylacetylene, divinylacetylene, methylvinylketone, and dichloro-1,3-butene-2 and to which 0.25 part of sulfur and 2 parts of cyclohexanol had been added was emulsified by gradual addition, with the rapid mechanical agitation secured by repeated passage through a centrifugal pump, to 100 parts of a solution in water of 4% of sodium abietate, 0.25% of sodium hydroxide and 0.25% of ammonium persulfate. The dispersion was then maintained in a vessel which could be externally heated or cooled at a temperature of 40° C. until polymerization was substantially complete as was shown by the rise in density of the dispersion (measured at 20° C.) to about 1.10. This ordinarily requires about 6 hours. Variations in the time required to complete the polymerization even when conditions are closely duplicated make it advisable to determine the end point by density measurements rather than by the lapse of a definite period of time.

When the polymerization was substantially complete, the latex was treated with 0.73 part of a 29% aqueous ammonia solution and also with a liquid mixture of 0.55 part of phenyl alpha-naphthylamine and 0.45 part of diphenylamine dispersed in 1 part of a 3% aqueous solution of the sodium salt of an acid obtained by condensing naphthalene sulfonic acids with formaldehyde according to U. S. Patent No. 1,191,480. The latex was then ready for storage and use.

A latex prepared according to this procedure showed no coagulation after 5 minutes mechanical agitation at high speed or after 3 months storage at ordinary temperature. When subjected to the "casein stability test" which consists of mixing the latex wtih a 2% solution of casein in dilute ammonium hydroxide in such proportions that there is 1 part of casein per 200 parts of polymer and stirring the mixture by hand for 5 minutes and repeating this stirring at 24 hour intervals, no coagulation took place within 3 months. This test is used in the industry to indicate the stability of latex toward compounding. The results with compounding given below are in accordance with this good "casein stability." On the other hand, a latex made exactly like the above except that no cyclohexanol was added was 4.5% coagulated by 5 minutes mechanical stirring, coagulated completely after 10 days storage, and was 30% coagulated by the first stirring in the "casein stability" test.

In addition to improving the stability of the latex as noted above, the cyclohexanol also produces several other desirable effects. Thus it retards the polymerization during its early stages thereby decreasing the quantity of heat to be removed when the removal of the heat of reaction is a problem, without, however much reducing the time required for complete polymerization. Furthermore, it largely prevents an increase in the viscosity of the dispersion during polymerization and thus facilitates heat interchange. Both these effects are of great importance in controlling the polymerization when it is carried out on a large scale and under conditions involving the rapid evolution of heat. Thus, as discussed below, it is often desirable to polymerize at temperatures above 40° and at chloroprene concentrations greater than 50%. Such procedures, in which it is ordinarily difficult to control the temperature because of the rapid generation of heat combined with the high viscosity of the dispersion, may be carried out with good temperature control by the use of cyclohexanol or similar reagent. Still other advantages of the use of cyclohexanol are the reduced tendency of the latex to foam and its much improved color.

Although, for simplicity, the above procedure has been described in terms of cyclohexanol, the present invention is not limited to the use of this particular reagent. Thus n-butanol, n-octanol, methyl cyclohexanol, and cyclohexanone, for example, have been found to give very similar results when used in place of cyclohexanol in the above procedure. The preferred alcohols and ketones are those which have a limited solubility in water, from about 1% to about 20% at ordinary temperatures. Further examples are n-hexanol, benzyl alcohol, methyl butyl ketone, and diethyl ketone. Less soluble compounds, for example borneol, and the mixture of alcohols present in pine oil, have a considerable effect, as do the more soluble compounds such as ethyl alcohol and acetone, but in general they are less effective than the preferred agents in stabilizing the latex and have much less effect in controlling polymerization, viscosity and color.

The operable as well as the preferred concentrations of the alcohols and ketones which may be used varies with the different compounds. It is not, therefore, practicable to set forth limiting or preferred concentrations for the whole class. In the case of cyclohexanol, from 1 to 3% based on the polymer is the preferred range and within this range, as indicated by the above examples, 2 per cent is particularly preferred. Both somewhat lower and somewhat higher proportions than those given as the preferred range may be used, but lower proportions are considerably less effective while larger amounts tend to reverse the phases of the chloroprene emulsion. For the other alcohols and ketones, it is possible by a simple experiment to determine readily the proper amounts to employ. It will be found in each case, however, that there is a preferred range and an operable range and that at either end of the operable range the same effects result as in the case of cyclohexanol. The best general characterization of the amounts of the alcohols and ketones as a class is that they are small amounts as compared with the quantity of chloroprene or polymerized chloroprene employed.

It is within the scope of the invention to add the alcohol or ketone at any time, for example, before, during, or after emulsification, or before, during, or after polymerization. By way of illustration, when only stabilization is desired, the alcohol or ketone may even be added after polymerization is complete. It is preferable to add the alcohol or ketone to the chloroprene prior to emulsification, although it may be added to the dispersion medium before or after emulsification. When the alcohol or ketone is added to the dispersing medium or to the dispersion either before or after polymerization, it is usually preferable to add it in the form of a solution or dispersion, for example, in the same medium which forms the continuous phase of the chloroprene dispersion. This method of addition is preferred since it tends to avoid the difficulty in dissolving some of the less soluble alcohols in the water of the dispersion medium and to avoid possible local coagulation, particularly when the more soluble alcohols are added. The greater solubility of the alcohols in the chloroprene makes it generally desirable, however, as disclosed above to add them directly to the chloroprene. The invention is not limited, however, to any particular method of addition; thus, in addition to what has been disclosed above, it is pointed out that part of the alcohol or ketone may be added at one time and part at another if desired. Furthermore, an alcohol and a ketone or a plurality of alcohols or of ketones or of both may be employed. It will be apparent, of course, that all the beneficial effects of the present invention are only obtained when the alcohol or ketone is added before any substantial amount of polymerization has taken place, although it is also within the scope of the invention to employ the alcohol or ketone for any, as well as all, of the functions it may have.

The present invention is likewise not limited to the specific emulsifying agent, proportions, conditions, etc., used in the above example. It may, in fact, be applied with advantage to any latices prepared by the method disclosed in the copending application of Collins, Serial No. 204,305, filed April 26, 1938, and already referred to above.

For making latices which are to be compounded and used for the manufacture of thin-walled articles or for impregnation or coating, it has been found, however, that preferred results are obtained with latices made with sulfur and by the use of water-soluble abietates, or hydroabietates, as illustrated in the above example, or of water-soluble salts of the sulfuric acid esters of alcohols of the aliphatic series containing from 8 to 16 carbon atoms and thus, as pointed out above, the use of these materials constitutes a preferred embodiment of the invention. The following example illustrates the application of the present invention to the preparation of a latex of this type.

*Example II*

One hundred parts of chloroprene substantially free from acetaldehyde, monovinylacetylene, divinylacetylene, methylvinylketone, and dichloro-1,3-butene-2 and to which 0.5 part of sulfur and 2 parts of cyclohexanol had been added was emulsified by gradual addition with the rapid mechanical agitation secured by repeated passage through a centrifugal pump to 100 parts of a solution in water of 2% of the sodium salts of the sulfuric acid esters of a mixture of aliphatic alcohols with an average chain length of 13 carbon atoms obtained from coconut oil. The dispersion was then maintained in a vessel which could be externally heated or cooled at a temperature of 25° C. until polymerization was substantially complete as was shown by the rise in density of the dispersion (measured at 20°) to about 1.10. This ordinarily requires about 20 hours.

When the polymerization was substantially complete, the latex was treated with 0.73 parts of a 29% aqueous ammonia solution and also with a liquid mixture of 0.55 part of phenyl alphanaphthylamine and 0.45 part of diphenylamine dispersed in 1 part of a 3% aqueous solution of the sodium salt of an acid obtained by condensing naphthalene sulfonic acids with formaldehyde according to U. S. Patent No. 1,191,480. The latex was then ready for storage and use, and when subjected to the various stability tests described in Example I, it showed a similar stability.

The purity of the chloroprene, the concentrations of chloroprene, hydrogen ions and emulsifying agents in the dispersions, the method of emulsification, the temperature of polymerization, and the method of stabilizing the latex are all subject to variation without exceeding the scope of the invention. Furthermore, the invention includes polymerization of chloroprene in the presence of another polymerizable material or a solvent or a film-forming material or a modifying agent or an inhibitor of polymerization or an accelerator (as in Example I) and also includes the use of any such materials after polymerization.

In general, as is apparent from the above, the present invention is simply an improvement upon the method of polymerization and the product disclosed in the copending application of Collins, Serial No. 204,305, filed April 26, 1938, so that the present invention may be varied in substantially the same way that the invention described in the said Collins application may be varied, always involving, however, in addition, the use of a water soluble alcohol or ketone. Accordingly, the present applicants contemplate, as part of their invention disclosed herein, the use of cyclohexanol and the other alcohols and ketones disclosed herein both broadly and specifically with each and every modification of the process set forth in the Collins application, except as indicated hereinafter. Therefore, the entire specification of the aforesaid Collins application is incorporated in this application by reference, and it is intended that the whole specification of the Collins application shall be considered a part of the specification of this case. Some features appear to require special consideration, however, and they are, therefore, discussed below.

According to the method of emulsion polymerization described in the aforesaid Collins application, the proportion of the sulfur used is ordinarily from about 0.25 per cent based on the chloroprene up to the maximum amount soluble in the chloroprene at the temperature of polymerization.

Thus, in addition to the effect upon the stability of the latex exerted by the alcohols and ketones, the purity of the chloroprene and the concentrations of the emulsifying agents and of the hydrogen ions also have some influence. For example, for the preparation of the stable latices, the chloroprene should not contain more than 0.5% of dichloro-1,3-butene-2 or other impurities which yield acids on hydrolysis. Impurities, in general, usually affect the properties of the polymer adversely, and, therefore, the chloroprene should be substantially free from divinyl acetylene and should not contain more than 0.5% of monovinyl acetylene or 0.2% of acetaldehyde. Increasing the concentration of the emulsifying agent and of the hydroxyl ions, improves the stability. The alkalinity may be increased, for example, by adding ammonia, caustic alkalies, or salts of weak acids, such as sodium carbonate and sodium silicate. The tendency of the chloroprene polymers to become stiff when kept for long periods at low temperatures may be reduced by increasing the temperature of polymerization, excellent results being obtained at 50° or above, or by polymerizing in the presence of chloroprene solvents or of other polymerizable compounds, for example, dichloro-2,3-butadiene-1,3, methyl methacrylate, or the acrylic nitriles. The viscosity of the finished latex is important, since it determines the thickness of the layer of material deposited by dipping operations. It may be increased by increasing the concentration of the latex or by the addition of casein, gelatine, starch, polyvinyl alcohol, or similar thickening agents.

Latices prepared according to the present invention may be used for all the purposes proposed for other chloroprene polymer latices and, because of their great stability, may be used with entire success in many cases where the use of other chloroprene polymer latices is only partly successful. Thus, the present latices may, in general, be compounded with any pigment to give stable compositions which may be further treated to give smooth, homogeneous deposits of the compounded polymer. On the other hand, it has in some cases been found impossible to obtain good deposits from the compounded latices containing no alcohol or similar agent. In order to compound, the pigment is usually dispersed in an equal weight of water containing 2% of casein in the form of its ammonium salt and 0.5% of the sodium salt of the naphthaleneformaldehyde sulfuric acid product already referred to. A little of the latex is then stirred into the pigment dispersion which is then added to the main volume of latex. Other methods of incorporating the pigment may of course be used. Examples of the pigments incorporated are carbon black (both "hard" and "soft"), magnesium oxide, whiting, clay, zinc oxide, lithopone, Titanox, and litharge. Sheets for testing are conveniently made from the compounded latices by immersing cups of unglazed porcelain wet with dilute ammonia in the latex, partly drying the sheet, stripping it from the cup, and heating it in air for 30 minutes at 140° C. This final treatment may also be carried out at other temperatures, for example 25, 50, or 100° if the time is correspondingly changed. The incorporation of pigments greatly increases the modulus of the sulfur-containing chloroprene polymer as illustrated below. The effect increases as the proportion of pigment is increased.

It has been found that the tensile strength of the compounded and cured material is greatly increased if small proportions of zinc oxide together with organic compounds containing one nitrogen atom and two sulfur atoms attached to the same carbon atom are added along with the other compounding ingredients. Examples of such compounds are thiazyl mercaptans and sulfides, thiuram sulfides, and dithiocarbamates. This effect is surprising and could not have been predicted in view of the different effects exerted by these same compounds with the same or similar polymers under other conditions, for example, as is disclosed in a copending application of Youker, Serial No. 204,362, filed April 26, 1938, compounds of this type have a plasticizing action upon chloroprene polymers prepared in the presence of sulfur. The preferred nitrogen-sulfur compounds are the disubstituted dithiocarbamates such as potassium hexamethylene dithiocarbamate and the tetrasubstituted thiuram sulfides, such as tetramethyl thiuram disulfide, and dipentamethylene thiuram tetrasulfide and the preferred amount to use is about 1% based on the polymer. It is within the scope of the invention to use greater or less amounts, however. Although a compound like zinc oxide must be present in order that the nitrogen-sulfur compound may function, as little as 1% of zinc oxide based on the polymer is effective for this purpose. Larger amounts of zinc oxide or a similar compound may be used, and, in general, about 5% based on the polymer is preferred. The following table gives the physical properties of test sheets, prepared as described above on porous cups.

*Physical properties of test sheet*

| Ex. No. | Composition | Modulus at 600% elong. | Tensile strength | Elongation at break |
|---|---|---|---|---|
| | | Lbs./sq. in. | Lbs./sq. in. | Percent |
| 3 | Latex of Example I | 50 | 2,800 | 1,300 |
| 4 | Ex. 3+10% Titanox and 5% ZnO | 275 | 2,125 | 900 |
| 5 | Ex. 4+1% hexamethylene ammonium hexamethylene dithiocarbamate | 475 | 4,525 | 940 |
| 6 | Latex of Example II | 175 | 3,100 | 1,140 |
| 7 | Ex. 6+10% Titanox and 5% ZnO | 1,050 | 3,250 | 770 |
| 8 | Ex. 7+hexamethylene ammonium hexamethylene dithiocarbamate | 800 | 4,200 | 880 |
| 9 | Ex. 3+50% lithopone | 625 | 2,425 | 1,120 |
| 10 | Ex. 3+50% Gastex* | 1,075 | 1,675 | 900 |
| 11 | Ex. 3+30% channel black | 625 | 1,275 | 830 |
| 12 | Ex. 3+5% ZnO+1% potassium hexamethylene dithiocarbamate | 300 | 3,325 | 920 |
| 13 | Ex. 12+5% sulfur | 950 | 4,325 | 890 |
| 14 | Ex. 3+5% ZnO+10% lithopone+1% zinc hexamethylene dithiocarbamate | 475 | 4,600 | 960 |
| 15 | Ex. 3 with lithopone for Titanox+1% dipentamethylene thiuram tetrasulfide | 675 | 4,150 | 930 |

*A semi-reinforcing carbon black.

The latices prepared according to the present invention, either with or without the addition of pigments or other compounding ingredients, may be used in general for any of the purposes for which natural rubber latex may be used or for any of the uses which have been described previously for latices of polymerized chloroprene or related halogen dienes. Attention is particularly called to the various uses described for the latex in Collins application, Serial No. 204,305, filed April 26, 1938, and the specification of which is a part of the specification of this case. In particular, the latices of the present application can be put to any of these uses. Thus, for example, they may be used for impregnating and coating, as adhesives and binders, and for the preparation of elastic articles. This last may be carried out in several different ways. For example, the latex may be deposited on porous forms as described above. It may also be deposited, for example by dipping, upon non-porous forms, a coagulating solution such as alcoholic calcium nitrate being applied before and/or after the dipping operation. The latex may also be treated with agents such as zinc oxide and ammonium salts or sodium fluorosilicate and thereby be caused to coagulate in molds by applying heat with the formation, after drying, of shaped articles of commerce.

The great advantage of the present invention is, of course, the markedly improved stability of the latices, particularly against the addition of compounding ingredients, such as pigments and reenforcing agents. Both the uncompounded latex and the compounded latex, whether or not the compounding ingredients be those which may be added to latices not stabilized as disclosed herein, are more stable to storage or mechanical agitation than are previously known latices. The presence of the alcohol or ketone in the sulfur containing latex also renders it novel in addition to adding to its utility. Other advantages apparent from the above are improved color, easier control of the polymerization, and reduced tendency of the latex to foam.

It is apparent that many widely different embodiments of this invention may be made without departing from the spirit and scope thereof and, therefore, it is not intended to be limited except as indicated in the appended claims.

We claim:

1. An aqueous dispersion comprising a polymer of chloro-2-butadiene-1,3, a water-soluble abietate as an emulsifying agent, and from about 1% to about 3% of cyclohexanol, based on the weight of the chloro-2-butadiene-1,3, said polymer being one formed by the process which comprises dispersing chloro-2-butadiene-1,3 which is substantially free from impurities which yield acids on hydrolysis in an aqueous medium in the presence of the aforesaid emulsifying agent, and then polymerizing the dispersed chloro-2-butadiene-1,3 in the presence of a quantity of sulfur ranging from about 0.25% of the weight of the chloro-2-butadiene-1,3 up to about the amount soluble in the chloro-2-butadiene-1,3 under the conditions of the polymerization, and in the presence of the cyclohexanol.

2. The process which comprises dispersing in an aqueous medium in the presence of a water-soluble abietate as an emulsifying agent, chloro-2-butadiene-1,3 which is substantially free from impurities which yield acids on hydrolysis and to which has been added from about 1% to about 3% of cyclohexanol by weight based on the chloro-2-butadiene-1,3 and a quantity of sulfur ranging from about 0.25% of the weight of the chloro-2-butadiene-1,3 up to about the amount soluble in the chloro-2-butadiene-1,3 under the conditions of the polymerization, and then polymerizing the chloro-2-butadiene-1,3 while so dispersed in the presence of the sulfur and of the cyclohexanol.

3. An aqueous dispersion comprising a polymer of chloro-2-butadiene-1,3, a water-soluble salt of a sulfuric acid ester of an alcohol of the aliphatic series containing from 8 to 16 carbon atoms as an emulsifying agent, and from about 1% to about 3% of cyclohexanol, based on the weight of the chloro-2-butadiene-1,3, said polymer being one formed by the process which comprises dispersing chloro-2-butadiene-1,3 which is substantially free from impurities which yield acids on hydrolysis in an aqueous medium in the presence of the aforesaid emulsifying agent, and then polymerizing the dispersed chloro-2-butadiene-1,3 in the presence of a quantity of sulfur ranging from about 0.25% of the weight of the chloro-2-butadiene-1,3 up to about the amount soluble in the chloro-2-butadiene-1,3 under the conditions of the polymerization, and in the presence of the cyclohexanol.

4. An aqueous dispersion comprising a polymer of chloro-2-butadiene-1,3, a water-soluble abietate as an emulsifying agent, a small amount of an antioxidant, and from about 1% to about 3% of cyclohexanol, based on the weight of the chloro-2-butadiene-1,3, said polymer being one formed by the process which comprises dispersing chloro-2-butadiene-1,3 which is substantially free from impurities which yield acids on hydrolysis in an aqueous medium in the presence of the aforesaid emulsifying agent, and then polymerizing the dispersed chloro-2-butadiene-1,3 in the presence of a quantity of sulfur ranging from about 0.25% of the weight of the chloro-2-butadiene-1,3 up to about the amount soluble in the chloro-2-butadiene-1,3 under the conditions of the polymerization, and in the presence of the cyclohexanol and thereafter adding to the dispersion a small amount of dilute ammonium hydroxide solution and the antioxidant.

5. An aqueous dispersion comprising a polymer of chloro-2-butadiene-1,3, a water-soluble salt of a sulfuric acid ester of an alcohol of the aliphatic series containing from 8 to 16 carbon atoms as an emulsifying agent, a small amount of an antioxidant, and from about 1% to about 3% of cyclohexanol, based on the weight of the chloro-2-butadiene-1,3, said polymer being one formed by the process which comprises dispersing chloro-2-butadiene-1,3 which is substantially free from impurities which yield acids on hydrolysis in an aqueous medium in the presence of the aforesaid emulsifying agent, and then polymerizing the dispersed chloro-2-butadiene-1,3 in the presence of sulfur ranging from about 0.25% of the weight of the chloro-2-butadiene-1,3 up to about the amount soluble in the chloro-2-butadiene-1,3 under the conditions of the polymerization, and in the presence of the cyclohexanol and thereafter adding to the dispersion a small amount of dilute ammonium hydroxide solution and the antioxidant.

6. The process which comprises dispersing in an aqueous medium in the presence of a water-soluble salt of a sulfuric acid ester of an alcohol of the aliphatic series containing from 8 to 16 carbon atoms as an emulsifying agent, chloro-2-butadiene-1,3 which is substantially free from impurities which yield acids on hydrolysis and to which has been added from about 1% to about 3% of cyclohexanol by weight based on the chloro-2-butadiene-1,3 and a quantity of sulfur ranging from about 0.25% of the weight of the chloro-2-butadiene-1,3 up to about the amount soluble in the chloro-2-butadiene-1,3 under the conditions of the polymerization, and then polymerizing the chloro-2-butadiene-1,3 while so dispersed in the presence of the sulfur and of the cyclohexanol.

7. The process which comprises dispersing in an aqueous medium in the presence of a water-soluble abietate as an emulsifying agent, chloro-2-butadiene-1,3 which is substantially free from impurities which yield acids on hydrolysis and to which has been added from about 1% to about 3% of cyclohexanol by weight based on the chloro-2-butadiene-1,3 and a quantity of sulfur ranging from about 0.25% of the weight of the chloro-2-butadiene-1,3 up to about the amount soluble in the chloro-2-butadiene-1,3 under the conditions of the polymerization, and then polymerizing the chloro-2-butadiene-1,3 while so dispersed in the presence of the sulfur and of the cyclohexanol, and thereafter adding to the dispersion a small amount of dilute ammonium hydroxide solution and a small amount of an antioxidant.

8. The process which comprises dispersing in an aqueous medium in the presence of a water-soluble salt of a sulfuric acid ester of an alcohol of the aliphatic series containing from 8 to 16 carbon atoms as an emulsifying agent, chloro-2-butadiene-1,3 which is substantially free from impurities which yield acids on hydrolysis and to which has been added from about 1% to about 3% of cyclohexanol by weight based on the chloro-2-butadiene-1,3 and a quantity of sulfur ranging from about 0.25% of the weight of the chloro-2-butadiene-1,3 up to about the amount soluble in the chloro-2-butadiene-1,3 under the conditions of the polymerization, and then polymerizing the chloro-2-butadiene-1,3 while so dispersed in the presence of the sulfur and of the cyclohexanol, and thereafter adding to the dispersion a small amount of dilute ammonium hydroxide solution and a small amount of an antioxidant.

9. In the process of preparing a dispersion of a polymer of chloro-2-butadiene-1,3 by polymerizing the chloro-2-butadiene-1,3 while emulsified in an aqueous medium in the presence of a small amount of sulfur, the step which comprises adding a small amount, insufficient to cause reversal in phase of the emulsion, of a non-polymerizable water-soluble alcohol.

10. A stable, aqueous dispersion having, as the dispersed phase, a rubber-like, polymeric material obtained by polymerizing, in aqueous emulsion, chloro-2-butadiene-1,3 in the presence of a small amount of sulfur and an amount, insufficient to cause reversal in phase of the emulsion, of a mixture of a non-polymerizable, water-soluble alcohol and a non-polymerizable water-soluble ketone.

11. A stable, aqueous dispersion having, as the dispersed phase, a rubber-like, polymeric material obtained by polymerizing in aqueous emulsion choloro-2-butadiene-1,3 which is substantially free from impurities which yield acids on hydrolysis, in the presence of a quantity of sulfur ranging from about 0.25 per cent of the weight of the chloro-2-butadiene-1,3 up to about the amount soluble in the chloro-2-butadiene-1,3 under the conditions of polymerization and in the presence of an amount, insufficient to cause reversal in phase of the emulsion, of a mixture of a non-polymerizable, water-soluble alcohol and a non-polymerizable, water-soluble ketone.

12. A stable, aqueous dispersion having, as the dispersed phase, a rubber-like, polymeric material obtained by emulsifying chloro-2-butadiene-1,3 in water by means of an emulsifying agent of the group consisting of water-soluble abietates, water-soluble hydroabietates, and water-soluble salts of the sulfuric esters of alcohols of the aliphatic series containing from 8 to 16 carbon atoms, and then polymerizing the emulsified chloro-2-butadiene-1,3 in the presence of a quantity of sulfur ranging from about 0.25 per cent the weight of the chloro-2-butadiene-1,3 up to about the amount soluble in the chloro-2-butadiene-1,3 under the conditions of the polymerization and in the presence of an amount, insufficient to cause reversal in phase of the emulsion, of a mixture of a non-polymerizable, water-soluble alcohol and a non-polymerizable, water-soluble ketone.

13. A stable, aqueous dispersion having, as the dispersed phase, a rubber-like, polymeric material obtained by polymerizing, in aqueous emulsion, chloro-2-butadiene-1,3, in the presence of a small amount of sulfur and an amount, insufficient to cause reversal in phase of the emulsion, of a non-polymerizable, water-soluble alcohol.

14. A stable, aqueous, dispersion having, as the dispersed phase, a rubber-like, polymeric material obtained by polymerizing, in aqueous emulsion, chloro-2-butadiene-1,3 in the presence of a quantity of sulfur ranging from about 0.25 per cent of the weight of the chloro-2-butadiene-1,3 up to about the amount soluble in the chloro-2-butadiene-1,3 under the conditions of the polymerization and in the presence of an amount, insufficient to cause reversal in phase of the emulsion, of a non-polymerizable, water-soluble alcohol.

15. A stable aqueous dispersion, having, as the dispersed phase, a rubber-like, polymeric material obtained by polymerizing, in aqueous emulsion, chloro-2-butadiene-1,3 in the presence of a quantity of sulfur ranging from about 0.25 per cent of the weight of the chloro-2-butadiene-1,3 up to about the amount soluble in the chloro-2-butadiene-1,3 under the conditions of the polymerization and in the presence of an amount, insufficient to cause reversal in phase of the emulsion, of a non-polymerizable alcohol having a solubility in water of from about 1 per cent to about 20 per cent at ordinary temperature.

16. A process which comprises emulsifying, in an aqeous medium, chloro-2-butadiene-1,3 which is substantially free from impurities which yield acids on hydrolysis and to which has been added a small amount, insufficient to cause reversal in phase of the emulsion, of a non-polymerizable alcohol having a solubility in water limited to from about 1 per cent to about 20 per cent at ordinary temperature and a small amount of sulfur, and then polymerizing the chloro-2-butadiene-1,3 while so emulsified in the presence of the water-soluble alcohol and of the sulfur.

17. A process which comprises emulsifying, in an aqueous medium in the presence of an emulsifying agent of the group consisting of water-soluble abietates, water-soluble hydroabietates, and water-soluble salts of the sulfuric acid esters of alcohols of the aliphatic series containing from 8 to 16 carbon atoms, chloro-2-butadiene-1,3 which is substantially free from the impurities which yield acids on hydrolysis and to which has been added a small amount, insufficient to cause reversal in phase of the emulsion, of a non-polymerizable alcohol having a solubility in water limited from about 1 per cent to about 20 per cent at ordinary temperature and a small amount of sulfur, and then polymerizing the chloro-2-butadiene-1,3 while so emulsified in the presence of the water-soluble alcohol and of the sulfur.

18. A stable, aqueous dispersion having, as the dispersed phase, a rubber-like, polymeric material obtained by polymerizing, in aqueous emulsion, chloro-2-butadiene-1,3, in the presence of a small amount of sulfur and an amount, insufficient to cause reversal in phase of the emulsion, of a non-polymerizable, water-soluble ketone.

19. A stable, aqueous, dispersion having, as the dispersed phase, a rubber-like, polymeric material obtained by polymerizing, in aqueous-emulsion, chloro-2-butadiene-1,3 in the presence of a quantity of sulfur ranging from about 0.25 per cent of the weight of the chloro-2-butadiene-1,3 up to about the amount soluble in the chloro-2-butadiene-1,3 under the conditions of the polymerization and in the presence of an amount, insufficient to cause reversal in phase of the emulsion, of a non-polymerizable, water-soluble ketone.

20. A stable, aqueous, dispersion having as the dispersed phase, a rubber-like, polymeric material obtained by polymerizing, in aqueous emulsion, chloro-2-butadiene-1,3 in the presence of a quantity of sulfur ranging from about 0.25 per cent of the weight of the chloro-2-butadiene-1,3 up to about the amount soluble in the chloro-2-butadiene-1,3 under the conditions of the polymerization and in the presence of an amount, insufficient to cause reversal in phase of the emulsion, of a non-polymerizable ketone having a solubility in water of from about 1 per cent to about 20 per cent at ordinary temperature.

21. A process which comprises emulsifying, in an aqueous medium, chloro-2-butadiene-1,3 which is substantially free from impurities which yield acids on hydrolysis and to which has been added a small amount, insufficient to cause reversal in phase of the emulsion, of a non-polymerizable ketone having a solubility in water limited to from about 1 per cent to about 20 per cent at ordinary temperature and a small amount of sulfur, and then polymerizing the chloro-2-butadiene-1,3 while so emulsified in the presence of the water-soluble ketone and of the sulfur.

22. A process which comprises emulsifying, in an aqueous medium in the presence of an emulsifying agent of the group consisting of water-soluble abietates, water-soluble hydroabietates, and water-soluble salts of the sulfuric acid esters of alcohols of the aliphatic series containing from 8 to 16 carbon atoms, chloro-2-butadiene-1,3 which is substantially free from the impurities which yield acids on hydrolysis and to which has been added a small amount, insufficient to cause reversal in phase of the emulsion, of a non-polymerizable ketone having a solubility in water limited from about 1 per cent to about 20 per cent at ordinary temperature and a small amount of sulfur, and then polymerizing the chloro-2-butadiene-1,3 while so emulsified in the presence of the water-soluble ketone and of the sulfur.

23. In the process of preparing a dispersion of a polymer of chloro-2-butadiene-1,3 while emulsified in an aqueous medium in the presence of a small amount of sulfur, the step which comprises adding a small amount, insufficient to cause reversal in phase of the emulsion, of a mixture of a non-polymerizable, water-soluble alcohol and a non-polymerizable, water-soluble ketone.

24. A stable aqueous dispersion having, as a dispersed phase, a rubber-like, polymeric material obtained by polymerizing, in aqueous emulsion, chloro-2-butadiene-1,3 in the presence of a small amount of sulfur and an amount, insufficient to cause reversal in phase of the emulsion, of a mixture of a non-polymerizable, water-soluble alcohol and a non-polymerizable, water-soluble ketone.

HOWARD W. STARKWEATHER.
FRANK N. WILDER.